(12) United States Patent
Larue et al.

(10) Patent No.: US 12,055,110 B2
(45) Date of Patent: Aug. 6, 2024

(54) MAGNETIC SENSOR FOR A VEHICLE DRIVE SHAFT (71) Applicant: Continental Automotive Technologies GmbH, Hannover (DE)

(72) Inventors: Marie-Nathalie Larue, Toulouse (FR); Fabien Joseph, Toulouse (FR); Stéphane Eloy, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 18/014,826

(22) PCT Filed: Jul. 7, 2021

(86) PCT No.: PCT/EP2021/068918
§ 371 (c)(1),
(2) Date: Jan. 6, 2023

(87) PCT Pub. No.: WO2022/013046
PCT Pub. Date: Jan. 20, 2022

(65) Prior Publication Data
US 2023/0296066 A1 Sep. 21, 2023

(30) Foreign Application Priority Data

Jul. 16, 2020 (FR) ........................ 2007443

(51) Int. Cl.
*F02D 41/00* (2006.01)
*G01D 5/24* (2006.01)
*G01D 5/245* (2006.01)
(52) U.S. Cl.
CPC ......... *F02D 41/009* (2013.01); *G01D 5/2457* (2013.01)

(58) Field of Classification Search
CPC ......... F02D 41/00; F02D 41/009; G01D 5/24; G01D 5/2457
See application file for complete search history.

(56) References Cited

U.S. PATENT DOCUMENTS 6,131,547 A * 10/2000 Weber ................. F02D 41/0097
73/114.25
6,479,987 B1  11/2002 Marx et al.
(Continued)

FOREIGN PATENT DOCUMENTS

FR   2925156 A1   6/2009
WO   2016082933 A1  6/2016

OTHER PUBLICATIONS

International Search Report and Written Opinion for International Application No. PCT/EP2021/068918, dated Oct. 19, 2021, 10 pages.
(Continued)

*Primary Examiner* — John Kwon
*Assistant Examiner* — Johnny H Hoang
(74) *Attorney, Agent, or Firm* — Buchanan Ingersoll & Rooney PC (57) ABSTRACT

A sensor for a motor vehicle, the vehicle including a combustion engine and an engine control computer. The engine includes at least one drive shaft able to be driven in rotation, the at least one drive shaft having at least one magnetic element, the sensor being disposed facing the at least one magnetic element, the computer being configured to determine the angular position of the at least one drive shaft in relation to a predefined reference angular position on the basis of an output signal supplied by the sensor, the sensor being characterized in that it is able to generate a square wave output signal. Each square wave is characterized by an initial instant and a temporal width, by associ-
(Continued)

ating each initial instant with a predefined angular position of the drive shaft.

7 Claims, 5 Drawing Sheets

(56) References Cited

U.S. PATENT DOCUMENTS

| | | | |
|---|---|---|---|
| 11,112,277 B2 | 9/2021 | Mirassou et al. | |
| 11,884,341 B2* | 1/2024 | Pramod | H02P 21/0003 |
| 2008/0136404 A1 | 6/2008 | Gauthier et al. | |
| 2017/0356967 A1* | 12/2017 | Romero | G01R 33/0029 |
| 2019/0120659 A1* | 4/2019 | Bussan | G01D 5/145 |
| 2020/0148253 A1* | 5/2020 | Sainath | B62D 5/0463 |
| 2020/0346688 A1* | 11/2020 | Otto | B60W 50/045 |
| 2022/0094253 A1* | 3/2022 | Houston | H02K 7/003 |
| 2022/0113164 A1* | 4/2022 | Fontanesi | G01R 33/0283 |
| 2022/0395861 A1* | 12/2022 | Snow | G06F 3/016 |

OTHER PUBLICATIONS

International Search Report and Written Opinion for International Application No. PCT/EP2021/068918, dated Oct. 19, 2021 (French) 16 pages.

French Search Report for French Application No. 2007443, dated Mar. 12, 2021 with translation, 14 pages.

English Translation of the Written Opinion for International Application No. PCT/EP2021/068918, dated Oct. 19, 2021, 7 pages.

\* cited by examiner

MAGNETIC SENSOR FOR A VEHICLE DRIVE SHAFT

CROSS REFERENCE TO RELATED APPLICATIONS

This application is the U.S. National Phase application of PCT International Application No. PCT/EP2021/068918, filed Jul. 7, 2021, which claims priority to French Patent Application No. 2007443, filed Jul. 16, 2020, the contents of such applications being incorporated by reference herein.

FIELD OF THE INVENTION

The invention relates to the field of combustion engines for vehicles, notably motor vehicles, and more specifically to a sensor and a method for synchronizing combustion engines.

BACKGROUND OF THE INVENTION

As is known, a combustion engine of a motor vehicle comprises hollow cylinders, each of which delimits a combustion chamber into which a fuel-air mixture is injected. This mixture is compressed in the cylinder by a piston and ignited so as to make the piston move in translation inside the cylinder. The movement of the pistons in each cylinder of the engine drives the rotation of an engine shaft, referred to as "crankshaft", making it possible to drive the rotation of the wheels of the vehicle via a transmission system.

The air is injected into the combustion chamber via one or more intake valves, which are regularly opened and closed. Similarly, the gases resulting from the fuel-air mixture are expelled through one or more exhaust valves. These valves are connected to one or more camshafts for successively commanding the opening and closure thereof. The crankshaft and the camshafts are notably mechanically connected by a timing belt or chain.

In order to optimize the operation of the combustion engine, and notably in order to determine the appropriate time to compress the fuel-air mixture in each cylinder, the combustion engine must be phased.

This is because, during an engine cycle, the crankshaft rotates twice while the camshaft rotates only once. It is also necessary to know whether the crankshaft is in the engine cycle in the first revolution or in the second revolution in order to inject the fuel at the correct time and into the correct cylinders, this step being referred to as synchronization of the engine.

For this purpose, a crankshaft sensor and a camshaft sensor are mounted in the vehicle in order to measure the angular position of the crankshaft and the angular position of the camshaft, respectively.

To that end, in a first existing solution, each sensor is mounted facing a toothed target fixed to the shaft and measures the variations in the magnetic field that are generated by the teeth passing in front of the sensor. The sensor thus generates a signal of sinusoidal type that it sends to the engine control computer of the vehicle in order for the latter to analyze it to determine the angular position of the shaft. With knowledge of the angular position of the crankshaft and the angular position of the camshaft, the computer can determine which revolution the crankshaft is in in the engine cycle and thus synchronize the engine.

In a second existing solution, it is known practice to use a camshaft sensor referred to as "magnetic" since it operates in association with a magnet fixed to the camshaft. This sensor instantaneously determines a value for the angular position of the camshaft from the movement of the magnet in the vicinity of the sensor, the movement of the magnet causing the magnetic field to vary in accordance with two mutually phase-shifted sinusoidal components.

The magnetic sensor sends the digital information for the angular position of the magnet to the engine control computer of the vehicle in real time via a dedicated digital communications bus in order that said computer can manage the injection of fuel into the cylinders.

Nowadays, most vehicles having a combustion engine use the first solution of a sensor associated with a toothed target, but it is becoming increasingly advantageous for automotive manufacturers to use the second sensor solution. However, the use of a dedicated digital communications bus makes the vehicle more complex and requires the intelligence of the engine control computer to be modified, which is particularly expensive.

Therefore, there is a need for a solution that makes it possible to overcome these drawbacks at least in part.

SUMMARY OF THE INVENTION

An aspect of the invention relates to a sensor for a motor vehicle, said vehicle comprising a combustion engine and an engine control computer, said engine comprising at least one drive shaft able to be driven in rotation, said at least one drive shaft having at least one magnetic element, said sensor being disposed facing said at least one magnetic element, said computer being configured to determine the angular position of the at least one drive shaft in relation to a predefined reference angular position on the basis of an output signal supplied by the sensor, the sensor being notable in that it is able to generate a square wave output signal, on the basis of a measurement of the absolute angular position of the drive shaft of a signal, wherein each square wave is characterized by an initial instant and a temporal width, by associating each initial instant with a predefined angular position of the drive shaft.

In this way, the sensor, associated with a magnetic element, is able to operate with an engine control computer configured to operate with a sensor associated with a toothed target. In other words, in the present case, the absolute angular position measurement sensor, thus modified according to an aspect of the invention, makes it possible to have a drive shaft without any type of toothed target, without thereby needing to modify the computer used in the vehicle.

Furthermore, the sensor makes it possible to avoid adding a digital communications bus dedicated to exchanging data between the sensor and the computer.

The sensor according to an aspect of the invention thus likewise makes it possible to reduce the cost of manufacture of a combustion engine, since it avoids the addition of a further communications bus and it makes it possible to use a drive shaft without any type of toothed target.

The camshaft sensor thus likewise makes it possible to simplify the architecture of the engine.

The sensor is preferably configured to:
i. measure the magnetic field generated by the passage of the at least one magnetic element in front of the sensor when the drive shaft is rotating,
ii. generate a cosinusoidal component and a sinusoidal component of the magnetic field measured,
iii. generate an intermediate signal giving the absolute angular position of the drive shaft on the basis of said cosinusoidal component and said sinusoidal component, iv. generate the square wave output signal of the sensor, by associating each initial instant with an absolute angular position of the intermediate signal generated, corresponding to a predefined angular position of the drive shaft over one complete revolution of said drive shaft.

Advantageously, each initial instant denotes the rising edge or the falling edge of a square wave.

Advantageously, the magnetic element is a magnet that comprises two poles and is fixed to one end of the drive shaft.

With preference, the magnetic element takes the form of a metallic disk fixed to the planar face of the end of the drive shaft.

An aspect of the invention likewise relates to a vehicle, notably motor vehicle, comprising a combustion engine and an engine control computer, said engine comprising at least one drive shaft able to be driven in rotation, said at least one drive shaft having at least one magnetic element, said vehicle being notable in that it comprises a sensor for measuring the absolute angular position of the drive shaft, as set out above, said computer being configured to determine the angular position of the at least one drive shaft in relation to a predefined reference angular position on the basis of a square wave output signal supplied by the sensor.

An aspect of the invention likewise relates to a method for generating an output signal implemented by a sensor as set out above, the method being notable in that it comprises a step of generating a square wave output signal, on the basis of the measurement of the absolute angular position of the drive shaft, wherein each square wave is characterized by an initial instant and a temporal width, by associating each initial instant with a predefined absolute angular position of the drive shaft.

The method preferably comprises the following steps:
i. measuring the magnetic field generated by the passage of the at least one magnetic element in front of the sensor when the drive shaft is rotating,
ii. generating a cosinusoidal component and a sinusoidal component of the magnetic field measured,
iii. generating an intermediate signal giving the absolute angular position of the drive shaft on the basis of said cosinusoidal component and said sinusoidal component,
iv. generating the square wave output signal of the sensor, by associating each initial instant with an absolute angular position of the intermediate signal generated, corresponding to a predefined angular position of the drive shaft over one complete revolution of said drive shaft.

An aspect of the invention likewise relates to a computer program product which is notable in that it has a set of program code instructions that, when executed by one or more processors, configure the one or more processors to implement a method as described above.

BRIEF DESCRIPTION OF THE DRAWINGS

Other features and advantages of aspects of the invention will become more clearly apparent from reading the following description. This description is purely illustrative and should be read with reference to the appended drawings, in which.

DETAILED DESCRIPTION OF AT LEAST ONE EMBODIMENT

An aspect of the invention will be presented for the purpose of implementation in a motor vehicle. However, any implementation in a different context, in particular for any vehicle comprising a combustion engine of which it is necessary to synchronize a crankshaft and a camshaft, is also targeted by an aspect of the present invention.

Figure 1:
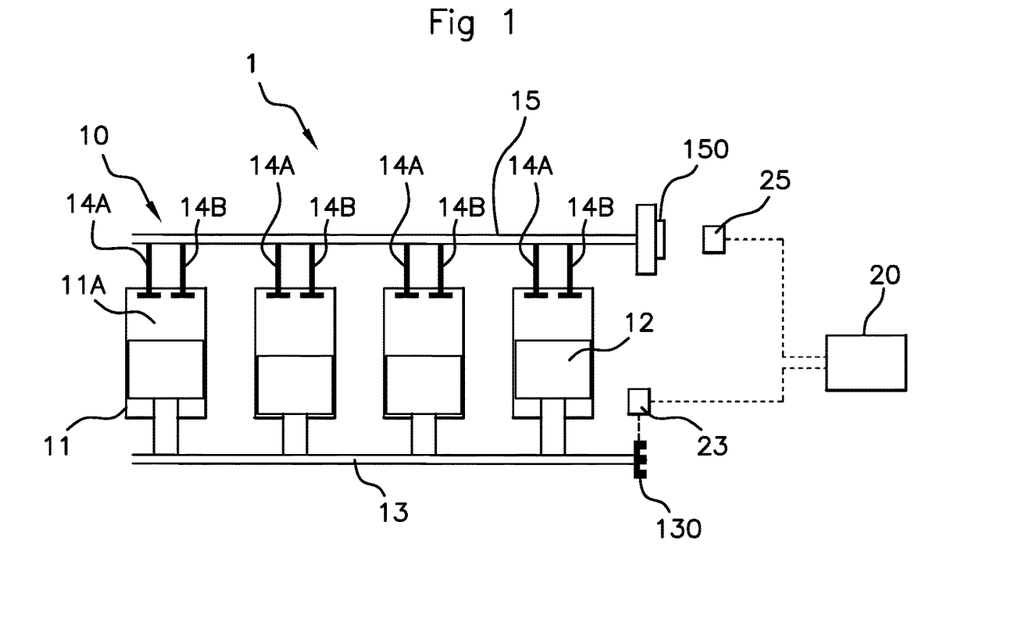
FIG. 1 schematically illustrates one embodiment of an engine according to the invention.

FIG. 1 shows one example of a vehicle 1 according to an aspect of the invention.

Vehicle 1

The vehicle 1 comprises a combustion engine 10 and a computer 20 referred to as "engine control computer" that is able to control said combustion engine 10, notably by commanding injections of fuel into the cylinders 11 of said combustion engine 10.

Engine

The combustion engine 10 comprises a plurality of cylinders 11, a crankshaft 13, at least one camshaft 15, a crankshaft sensor 23 and at least one camshaft sensor 25.

In this nonlimiting example, the combustion engine 10 comprises a line of cylinders 11 connected to a camshaft 15 and to the crankshaft 13. However, in another embodiment, the combustion engine 10 could comprise more than one line of cylinders 11, each line of cylinders 11 being associated with a different camshaft 15 and the plurality of lines of cylinders 11 being connected to a single crankshaft 13.

1) Cylinders 11

The line of cylinders 11 comprises a plurality of cylinders 11, for example two, three, four, five or six cylinders 11, that each delimit a combustion chamber 11A in which a piston 12 slides, the movement of which is driven by compression and expansion of the gases resulting from the compression of a fuel-air mixture introduced into the combustion chambers 11A.

More specifically, in this example, the combustion engine 10 is of the four-stroke engine type. It is also the case that, during operation of the engine 10, four operating phases are required for each cylinder 11: a phase for the intake of air and fuel into the combustion chamber 11A of the cylinder 11, a phase of compressing the mixture obtained, at the end of which it will be combusted, a phase of expanding the gases resulting from the combustion of the mixture, generating the thrust of the piston 12, and a phase of exhausting the gases from the combustion chamber 11A. These four phases form a repeating cycle of the combustion engine 10. During the intake phase and the expansion phase, the piston 12 descends to the low position. During the compression phase and the exhaust phase, the piston 12 rises to the high position.

2) Camshafts 15

The air and the gases are introduced into and expelled from the combustion chamber 11A via intake valves 14A and exhaust valves 14B, respectively, which are connected to the corresponding camshaft 15 of the line of cylinders 11.

More specifically, the camshaft 15, which is set in rotation, makes it possible to alternately open and close the intake valve 14A and exhaust valve 14B of each combustion chamber 11A. Alternatively, the engine 10 of the vehicle 1 could also equally comprise two camshafts 15 per line of cylinders 11, one of which is dedicated to the intake valves 14A and the other of which is dedicated to the exhaust valves 14B. Similarly, in this example, each cylinder 11 is connected to an intake valve 14A and to an exhaust valve 14B; however, each cylinder 11 could also be connected to multiple intake valves 14A and to multiple exhaust valves 14B.

3) Crankshaft 13

Each cylinder 11 is connected to the crankshaft 13 via its piston 12. The crankshaft 13 is thus set in rotation by the thrust of each piston 12, this rotation making it possible to transfer energy by way of a flywheel (not shown), driving the rotation of the wheels of the vehicle 1.

During an engine cycle, the crankshaft 13 rotates twice while the camshaft 15 rotates only once. In other words, the crankshaft 13 rotates twice as much as the camshaft 15.

Thus, in order to ensure correct operation of the combustion engine 10, it is necessary to synchronize the combustion engine 10 and therefore synchronize the angular position of the camshaft 15 and the angular position of the crankshaft 13. In other words, it is necessary first of all to know the angular position of the camshaft 15 and of the crankshaft 13.

In order to determine the angular position of the crankshaft 13, the crankshaft 13 comprises a toothed wheel 130, usually referred to as "crankshaft target" by those skilled in the art. The toothed wheel 130 has, for example, a predetermined number of evenly spaced-apart teeth and a free space serving as reference for the angular position. In another embodiment, the toothed wheel 130 could comprise more than one free space. Since such a toothed wheel 130 is known per se, it will not be described further here.

Crankshaft Sensor 23

A crankshaft sensor 23 is mounted facing the toothed wheel 130 so as to make it possible to detect the free space of said toothed wheel 130 and the passage of the teeth of the toothed wheel 130 in front of said crankshaft sensor 23 when the crankshaft 13 is rotating.

To that end, the crankshaft sensor 23 is configured to transmit a signal comprising rising and falling edges, representing the passage of the teeth and the free space of the toothed wheel 130.

The crankshaft sensor 23 may, for example, be a Hall effect sensor, known to those skilled in the art.

Camshaft 15

Figure 2:
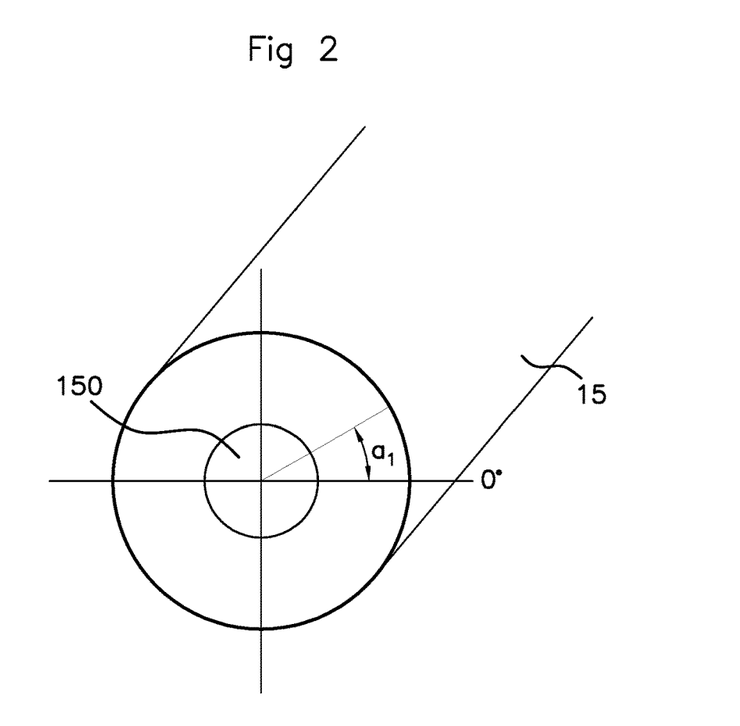
FIG. 2 illustrates one embodiment of the magnetic element mounted on a camshaft of the engine according to FIG. 1.

In this example, with reference to FIG. 2, each camshaft 15 takes the form of a cylindrical shaft of circular cross section.

In order to determine the angular position of the camshaft 15, the camshaft 15 has at least one magnetic element 150.

In the present case, in order to simplify the description, it will be considered that the camshaft 15 comprises only a single magnetic element 150.

The magnetic element 150 is preferably a magnet comprising two poles.

The magnetic element 150 may, for example, be fixed to one end of the camshaft 15.

In this example, as illustrated in FIG. 2, the magnetic element 150 takes the form of a metallic disk fixed to the planar face of the end of the camshaft 15 coaxially with said shaft, that is to say such that the axis of revolution of the disk coincides with the axis of revolution of the camshaft 15.

According to another embodiment, the magnetic element 150 takes the form of a metallic torus, notably denoting a volume created by a circle, or a ring, which turns about an axis of revolution, the axis of revolution being located in the plane of the circle, or of the ring, and not passing through the center of said circle, or said ring. The metallic torus is fixed to the planar face of the end of the camshaft 15 coaxially with said shaft, that is to say such that the axis of revolution of the metallic torus coincides with the axis of revolution of the camshaft 15.

Camshaft Sensor 25

Again with reference to FIG. 1, the combustion engine 10 comprises a camshaft sensor 25, referred to as "magnetic" camshaft sensor, which is mounted facing the magnetic element 150. The camshaft sensor 25 comprises three connectors: a connector dedicated to supplying power to the camshaft sensor 25, a connector dedicated to ground, and a connector dedicated to communication, notably with a computer. In other words, with reference to FIG. 3, the camshaft sensor 25 comprises a connection pin 251 comprising three connectors 252.

Figure 3:
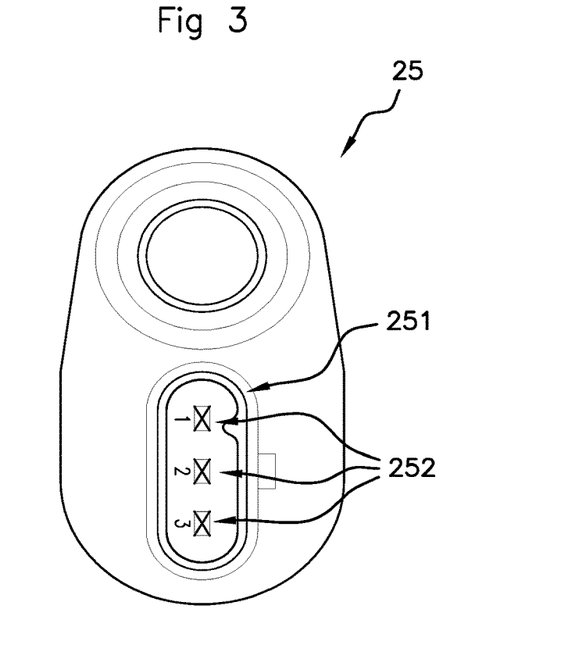
FIG. 3 illustrates one embodiment of the camshaft sensor according to the invention, FIG. 4 schematically illustrates one embodiment of the method according to the invention.

When the camshaft 15 is driven in rotation, the camshaft sensor 25 is configured to generate a signal enabling the computer 20 to determine the angular position of the camshaft 15.

To that end, the camshaft sensor 25 is configured to measure the magnetic field generated by the at least one magnetic element 150 when the camshaft 15 is rotating as a function of time, in order to determine the absolute angular position of the camshaft 15. Such a sensor is understood as being a sensor able to determine the angular position of the camshaft with a precision of 0.1°. However, the implementation of such an absolute angular measurement sensor requires the modification of the communications bus between said sensor and the computer 20, and also modification of the computer 20 in order to be able to process the data. This is because the amount of measurements and therefore data generated by said sensor is increased and transmitted continuously, and it is therefore necessary to dimension the communications bus and the processing and data receiving capacities of the computer 20 appropriately. However, these modifications are expensive. An aspect of the invention therefore proposes a sensor which avoids such modifications.

More specifically, the camshaft sensor 25 is configured to measure the magnetic field in the plane comprising that end of the camshaft 15 to which the magnetic element 150 is fixed.

Figure 5:
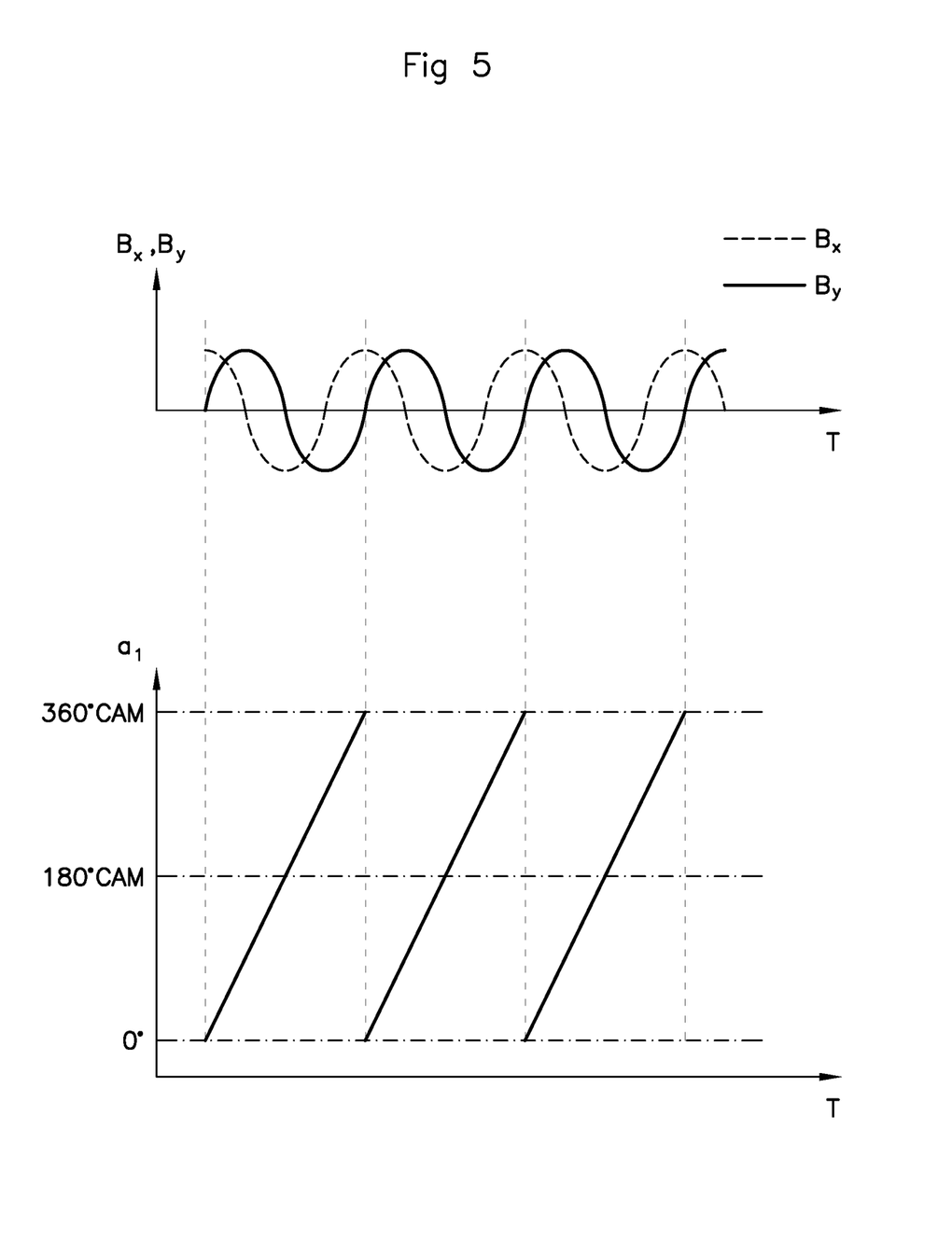
FIG. 5 illustrates one embodiment of the step of generating a cosinusoidal component and a sinusoidal component, and one embodiment of the step of generating an intermediate signal of the method according to the invention.

In addition, with reference to the first graph of FIG. 5, the camshaft sensor 25 is configured to generate a cosinusoidal component Bx and a sinusoidal component By of the magnetic field measured beforehand as a function of time T.

In other words, the cosinusoidal component Bx denotes the cosine of the absolute angular position $a_1$, shown in FIG. 2.

In addition, the sinusoidal component By denotes the sine of the absolute angular position $a_1$, shown in FIG. 2.

The camshaft sensor 25 is likewise configured to generate an intermediate signal on the basis of said cosinusoidal component Bx and said sinusoidal component By that were generated. To that end, the camshaft sensor 25 is configured to determine at all times, in other words for each set comprising a value for the cosinusoidal component Bx and a value for the sinusoidal component By, the absolute angular position $a_1$ of the camshaft 15.

Notably, the camshaft sensor 25 is configured to determine the absolute angular position $a_1$ of the camshaft 15, at all times, by determining the angular position $a_1$ that satisfies the following formula:

$$By^2 + Bx^2 = 1 \text{ in which } Bx = \cos(a_1) \text{ and } By = \sin(a_1).$$

Furthermore, a period of the cosinusoidal component Bx and the sinusoidal component By represents a cycle of the combustion engine 10 and therefore one revolution of the camshaft 15. In other words, for a cycle of the combustion engine 10, the set of determined angular positions $a_1$ of the camshaft 15 varies from 0° to 360°, denoted ° CAM.

According to an aspect of the invention, for each cycle of the combustion engine 10, and thus for each revolution of the camshaft 15, the camshaft sensor 25 is also able to generate a square wave output signal, wherein each square wave is characterized by an initial instant and a temporal width, by associating each initial instant with a predefined absolute angular position of the camshaft 15. More specifically, each initial instant is associated with an absolute angular position $a_1$ of the intermediate signal generated, corresponding to a predefined angular position of the camshaft 15.

The output signal is thus generated over at least one complete revolution of the camshaft 15.

The set of predefined angular positions denotes a set of angular positions, defined beforehand, between 0° CAM and 360° CAM, the interval between 0° CAM and 360° CAM representing one complete revolution of the camshaft 15. More specifically, the set of predefined angular positions comprises n angular position values, with n being a natural integer notably between 1 and 360, and more specifically between 6 and 120, distributed at regular intervals, and at least one angular position value referred to as "reference" or "asymmetrical" angular position value, making it possible to determine the angular position of the camshaft 15 at a given instant.

In the example set out here, the number of values n of evenly distributed predefined angular positions is equal to 12. Thus, the set of predefined angular positions comprises the value 0° CAM and all the multiples of 30° CAM, up to 360° CAM, and a sole reference angular position value, predefined for example at 105° CAM.

In other words, for each cycle of the combustion engine 10, the camshaft sensor 25 is configured to select the determined angular positions that correspond, in other words are equal, to the predefined angular positions. In addition, as explained above, the camshaft sensor 25 is configured to associate each determined and selected angular position with the initial instant of a square wave.

The camshaft sensor 25 is likewise configured to associate a rising edge or a falling edge of a square wave with each initial instant.

In addition, the camshaft sensor 25 is configured to define the temporal width and the voltage amplitude of each square wave. Notably, the temporal width of each square wave is defined on the basis of a predefined temporal width. The voltage amplitude corresponds notably to the voltage supplied to the camshaft sensor 25.

For example, the predefined temporal width is equal to a value of between 20 µs and 150 µs, preferably 45 µs.

The voltage amplitude varies notably between 0 and 5 volts.

The camshaft sensor 25 is likewise configured to transmit the output signal generated to the engine control computer 20.

Computer 20

In order to synchronize the angular position of the crankshaft 13 and of the camshaft 15, the engine control computer 20 is mounted in the vehicle and is connected to the crankshaft sensor 23 and to the camshaft sensor 25.

The computer 20 is configured to receive a signal transmitted by the crankshaft sensor 23, and to determine the angular position of 0° to 720°, denoted ° CRK, of the crankshaft 13 on the basis of said transmitted signal.

The computer 20 is likewise configured to receive the output signal generated and transmitted by the camshaft sensor 25. In addition, the computer 20 is configured to detect the square wave referred to as "reference" square wave, in other words a reference tooth or a reference recess of the output signal, corresponding to the predefined reference angular position. Lastly, the computer 20 is configured to determine the angular position of the camshaft between 0° CAM and 360° CAM on the basis of said transmitted output signal and with respect to the reference square wave detected.

The computer may likewise be configured to determine the rotational speed of the camshaft 15.

Method

Figure 4:
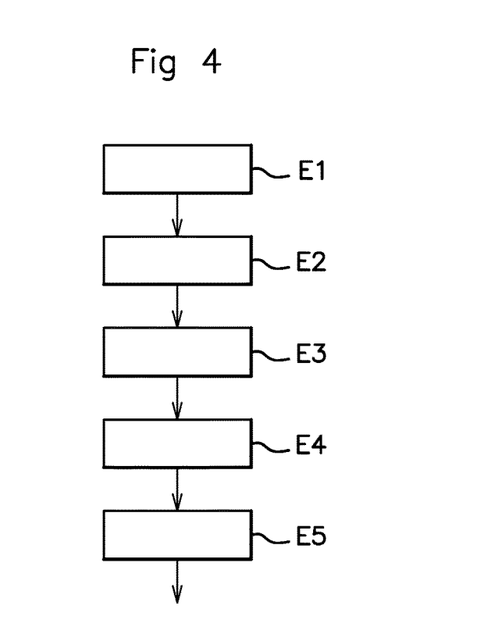

With reference to FIG. 4, one embodiment of the method implemented by a combustion engine 10 as set out above will now be described. According to said embodiment of the method, the rotational speed of the camshaft 15 is constant. However, it goes without saying that the rotational speed may vary from one revolution of the camshaft 15 to the next.

Measuring E1 the Magnetic Field

The method comprises, first of all, a step of measuring E1 the magnetic field generated by the at least one magnetic element 150 when the camshaft is rotating 15 as a function of time T.

Specifically, when the camshaft 15 is rotating, the magnetic element 150 also rotates about its axis of revolution, causing the magnetic field generated by the magnetic element 150 to vary.

More specifically, during this step, the camshaft sensor 25 measures the magnetic field in the plane in which the magnetic element 150 is defined.

Generating E2 Cos/Sin Component

The method then comprises a step E2 of generating, by way of the camshaft sensor 25, a cosinusoidal component Bx and a sinusoidal component By of the magnetic field measured beforehand as a function of time T.

With reference to FIG. 5, the cosinusoidal component Bx and the sinusoidal component By of the field measured are shown in the first graph.

In other words, the cosinusoidal component Bx denotes the cosine of the absolute angular position $a_1$, shown in FIG. 2.

In addition, the sinusoidal component By denotes the sine of the absolute angular position $a_1$, shown in FIG. 2.

Generating E3 an Intermediate Signal

According to an aspect of the invention, the method then comprises a step E3 of generating an intermediate signal, by way of the camshaft sensor 25, on the basis of said cosinusoidal component Bx and said sinusoidal component By.

With reference to FIG. 5, the intermediate signal is shown on the second graph. More specifically, during this step, the camshaft sensor 25 determines at all times, in other words for each set comprising a value for the cosinusoidal component Bx and a value for the sinusoidal component By, the absolute angular position $a_1$ of the camshaft 15.

Thus, the intermediate signal is defined by the variation in the absolute angular position $a_1$ of the camshaft 15 as a function of time T.

In addition, since the rotational speed of the camshaft 15 is constant, the intermediate signal is a linear function.

For example, to determine the absolute angular position $a_1$ of the intermediate signal for each instant, the camshaft sensor 25 determines the angular position $a_1$ that satisfies the following formula:

$$By^2 + Bx^2 = 1 \text{ in which } Bx = \cos(a_1) \text{ and } By = \sin(a_1).$$

Generating E4 an Output Signal

The method then comprises a step E4 of generating, by way of the camshaft sensor 25, a square wave output signal for each cycle of the combustion engine 10.

Figure 6:
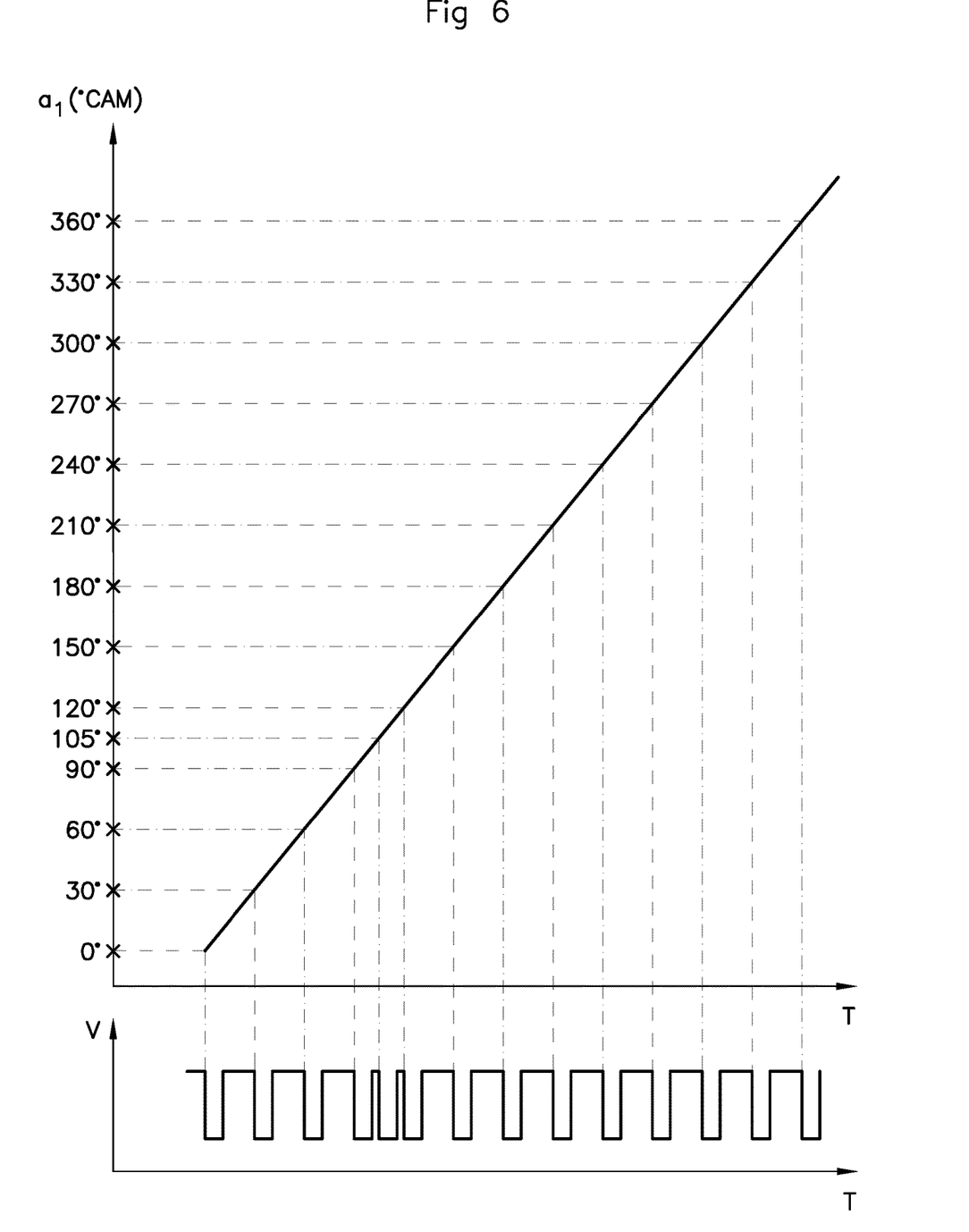
FIG. 6 shows the intermediate signal, over one period of the cosinusoidal component and the sinusoidal component, generated during the step of generating an intermediate signal of the method according to an aspect of the invention.

Thus, with reference to FIG. 6, the intermediate signal is therefore considered over a period of the cosinusoidal component Bx and the sinusoidal component By.

Notably, each square wave of the output signal is characterized by an initial instant and a temporal width. Each initial instant is associated with a predefined angular position of the camshaft 15. More specifically, each initial instant is associated with an absolute angular position $a_1$ of the intermediate signal generated, corresponding to a predefined angular position of the camshaft 15.

The initial instant of each square wave is therefore defined on the basis of the intermediate signal generated and the set of predefined angular positions between 0° CAM and 360° CAM.

More specifically, on the intermediate signal, the determined absolute angular positions $a_1$ corresponding to the predefined angular positions are selected.

Each initial instant is then associated with a selected determined angular position.

Each initial instant is associated with a square wave, and more specifically with the rising edge or the falling edge of said square wave.

In addition, in order to generate the output signal, the temporal width of each square wave has been predefined, as explained above, notably between 20 μs and 150 μs, preferably 45 μs.

In addition, each square wave of the signal is characterized by a voltage amplitude, notably between 0 and 5 V.

Figure 7:
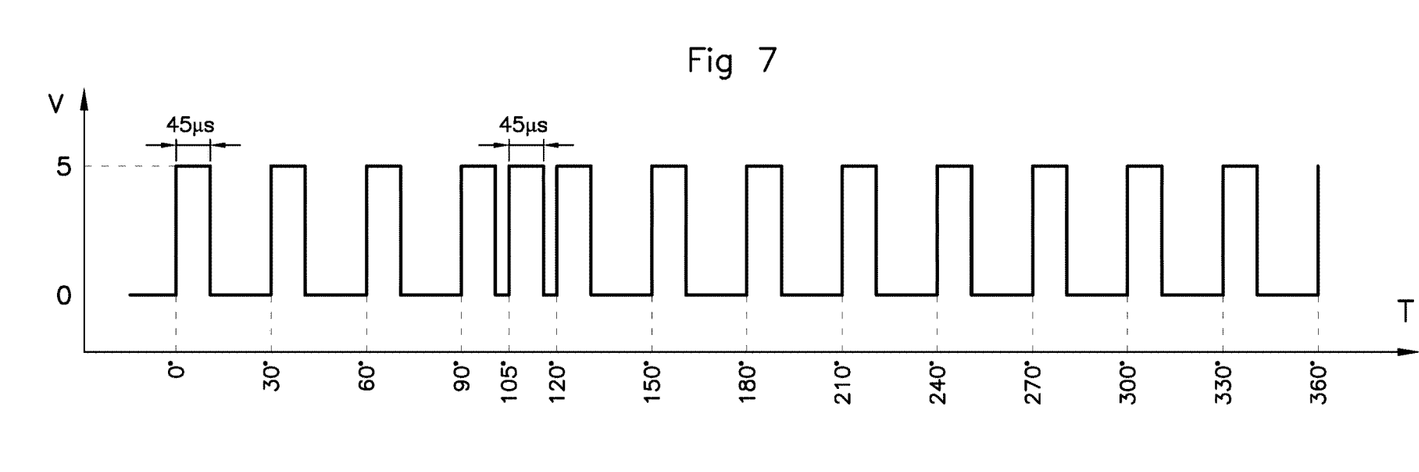
FIG. 7 shows one embodiment of the output signal generated during the step of generating an output signal of the method according to the invention.

Thus, with reference to FIG. 7, one embodiment of the output signal is shown. The output signal thus represents a virtual target profile for the camshaft 15. In this example, each initial instant corresponds to the rising edge of a square wave. Thus, each upwardly oriented square wave represents a tooth in the virtual target of the camshaft 15.

Thus, the virtual target comprises twelve evenly distributed teeth and a thirteenth reference tooth, since it corresponds to the predefined reference angular position. The thirteen teeth have a temporal width of 45 μs. The voltage amplitude is defined at 5 volts.

Figure 8:
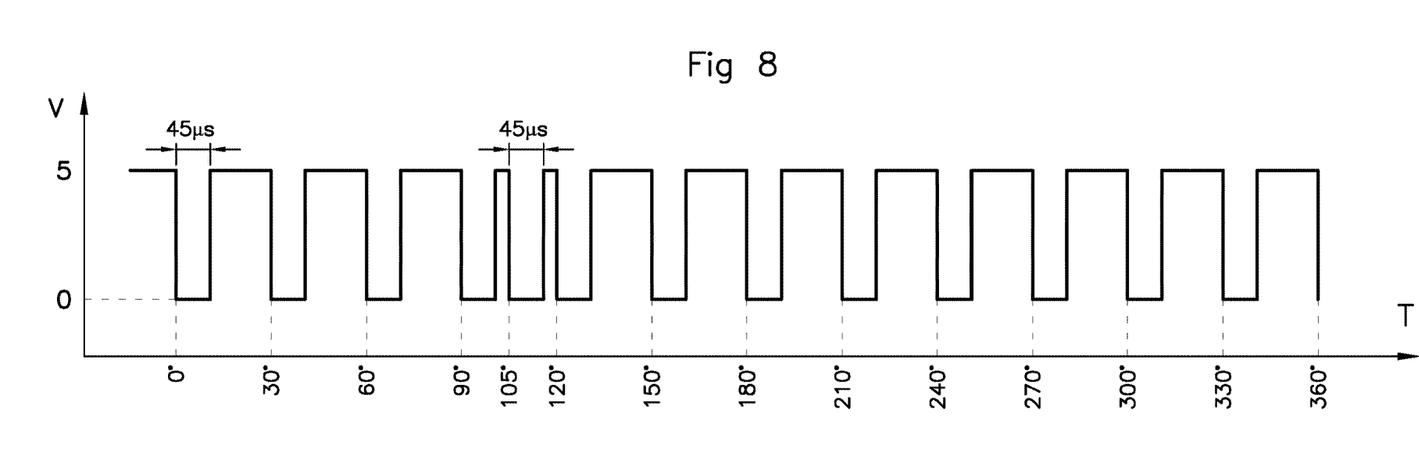
FIG. 8 shows another embodiment of the output signal generated during the step of generating an output signal of the method according to the invention.

Furthermore, with reference to FIG. 8, another embodiment of the output signal is shown, representing a virtual target profile for the camshaft 15. In this example, each initial instant corresponds to the falling edge of a square wave. Thus, each downwardly oriented square wave represents a recess in the virtual target of the camshaft 15.

Thus, the virtual target comprises thirteen recesses, twelve of which are evenly distributed, and a reference recess corresponding to the predefined reference angular position. The thirteen recesses have a temporal width of 45 μs. The voltage amplitude is defined at 5 volts.

Transmitting E5

The method then comprises a step E5 of transmitting the output signal generated, by way of the camshaft sensor 25, to the computer 20 via that connector of the camshaft sensor 25 that is dedicated to communication with the computer 20.

The computer 20 therefore receives the output signal, and on the basis of said output signal received determines the angular position of the camshaft 15.

The computer may likewise determine the rotational speed of the camshaft 15.

To that end, the computer 20 detects the reference square wave, in other words the reference tooth or the reference recess, corresponding to the predefined reference angular position. Lastly, the computer 20 determines at all times the angular position of the camshafts 15 with respect to the reference square wave detected.

Thus, the camshaft sensor 25 makes it possible to determine a virtual target profile for the camshaft 15 on the basis of measurements of the magnetic field generated by a magnetic element 150 fixed to said camshaft 15. Said virtual target profile may be analyzed by computers known to those skilled in the art in order to determine the angular position of the camshaft 15, and notably the rotational speed of the camshaft 15, and thus control the synchronization between the at least one camshaft 15 and the crankshaft 13.

The invention claimed is:

1. A method for generating an output signal implemented by a sensor for a motor vehicle, said motor vehicle comprising a combustion engine and an engine control computer, said combustion engine comprising:
    at least one drive shaft able to be driven in rotation, said at least one drive shaft having at least one magnetic element, said sensor being disposed facing said at least one magnetic element, said engine control computer being configured to determine an angular position of the at least one drive shaft in relation to a predefined reference angular position on a basis of an output signal supplied by the sensor, the method comprising:
    i. measuring a magnetic field generated by a passage of the at least one magnetic element in front of the sensor when the drive shaft is rotating;
    ii. generating a cosinusoidal component and a sinusoidal component of the measured magnetic field;
    iii. generating an intermediate signal giving an absolute angular position of the drive shaft on the basis of said cosinusoidal component and said sinusoidal component; and
    iv. generating a square wave output signal, in which each square wave comprises an initial instant and a temporal width, by associating each initial instant with an absolute angular position of the generated intermediate signal, corresponding to a predefined angular position of the drive shaft over one complete revolution of said drive shaft.

2. A non-transitory computer program product, comprising a set of program code instructions that, when executed by one or more processors, configure the one or more processors to implement a method for generating an output signal implemented by a sensor for a motor vehicle, said motor vehicle comprising a combustion engine and an engine control computer, said combustion engine comprising:
    at least one drive shaft able to be driven in rotation, said at least one drive shaft having at least one magnetic element, said sensor being disposed facing said at least one magnetic element, said engine control computer being configured to determine an angular position of the at least one drive shaft in relation to a predefined reference angular position on a basis of an output signal supplied by the sensor, the method comprising:
    i. measuring a magnetic field generated by a passage of the at least one magnetic element in front of the sensor when the drive shaft is rotating;
    ii. generating a cosinusoidal component and a sinusoidal component of the measured magnetic field;
    iii. generating an intermediate signal giving an absolute angular position of the drive shaft on the basis of said cosinusoidal component and said sinusoidal component; and
    iv. generating a square wave output signal, in which each square wave comprises an initial instant and a temporal width, by associating each initial instant with an absolute angular position of the generated intermediate signal, corresponding to a predefined angular position of the drive shaft over one complete revolution of said drive shaft.

3. A sensor for a motor vehicle, said vehicle comprising a combustion engine and an engine control computer, said combustion engine comprising:
    at least one drive shaft able to be driven in rotation, said at least one drive shaft having at least one magnetic element, said sensor being disposed facing said at least one magnetic element, said engine control computer being configured to determine an angular position of the at least one drive shaft in relation to a predefined reference angular position on a basis of an output signal supplied by the sensor, the sensor configured to:
    i. measure a magnetic field generated by the passage of the at least one magnetic element in front of the sensor when the drive shaft is rotating;
    ii. generate a cosinusoidal component and a sinusoidal component of the measured magnetic field;
    iii. generate an intermediate signal giving an absolute angular position of the drive shaft on the basis of said cosinusoidal component and said sinusoidal component;
    iv. generate a square wave output signal of the sensor, in which each square wave comprises an initial instant and a temporal width, by associating each initial instant with an absolute angular position of the generated intermediate signal, corresponding to a predefined angular position of the drive shaft over one complete revolution of said drive shaft.

4. The sensor as claimed in claim 3, wherein each initial instant denotes a rising edge or a falling edge of the square wave output signal.

5. A vehicle comprising a combustion engine and an engine control computer, said engine comprising at least one drive shaft able to be driven in rotation, said at least one drive shaft having at least one magnetic element, said vehicle comprising at least one drive shaft able to be driven in rotation, said at least one drive shaft having at least one magnetic element, and a sensor disposed facing said at least one magnetic element, said engine control computer being configured to determine an angular position of the at least one drive shaft in relation to a predefined reference angular position on a basis of an output signal supplied by the sensor, the sensor configured to:
    i. measure a magnetic field generated by the passage of the at least one magnetic element in front of the sensor when the drive shaft is rotating;
    ii. generate a cosinusoidal component and a sinusoidal component of the measured magnetic field;
    iii. generate an intermediate signal giving an absolute angular position of the drive shaft on the basis of said cosinusoidal component and said sinusoidal component;
    iv. generate a square wave output signal of the sensor, in which each square wave comprises an initial instant and a temporal width, by associating each initial instant with an absolute angular position of the generated intermediate signal, corresponding to a predefined angular position of the drive shaft over one complete revolution of said drive shaft,
    said sensor measuring the absolute angular position of the drive shaft, said computer being configured to determine the angular position of the at least one drive shaft in relation to a predefined reference angular position on the basis of a square wave output signal supplied by the sensor.

6. The vehicle as claimed in claim 5, wherein the magnetic element is a magnet that comprises two poles and is fixed to one end of the drive shaft.

7. The vehicle as claimed in claim 5, wherein the magnetic element takes the form of a metallic disk fixed to a planar face of the end face of the drive shaft.

* * * * *